United States Patent
Muramatsu et al.

(10) Patent No.: US 7,835,901 B2
(45) Date of Patent: Nov. 16, 2010

(54) SPEECH RECOGNITION APPARATUS AND NAVIGATION SYSTEM

(75) Inventors: Satoru Muramatsu, Kariya (JP); Yoshihiko Sugawara, Obu (JP)

(73) Assignee: DENSO CORPORATION, Kariya (JP)

( * ) Notice: Subject to any disclaimer, the term of this patent is extended or adjusted under 35 U.S.C. 154(b) by 899 days.

(21) Appl. No.: 11/717,168

(22) Filed: Mar. 13, 2007

(65) Prior Publication Data
US 2009/0099763 A1 Apr. 16, 2009

(30) Foreign Application Priority Data
Mar. 13, 2006 (JP) ............... 2006-68051

(51) Int. Cl.
G06F 17/20 (2006.01)
G10L 15/00 (2006.01)
G10L 15/04 (2006.01)
G10L 11/00 (2006.01)

(52) U.S. Cl. ............ 704/8; 704/231; 704/251; 704/270

(58) Field of Classification Search .......... None
See application file for complete search history.

(56) References Cited

U.S. PATENT DOCUMENTS

| | | | |
|---|---|---|---|
| 6,125,341 A * | 9/2000 | Raud et al. ............ 704/8 |
| 6,243,675 B1 * | 6/2001 | Ito ................... 704/232 |
| 6,892,190 B2 * | 5/2005 | Hatori et al. ............ 706/12 |
| 6,963,836 B2 * | 11/2005 | Van Gestel ............ 704/251 |
| 7,277,846 B2 * | 10/2007 | Satoh .................. 704/3 |
| 2004/0030560 A1 | 2/2004 | Takami et al. |
| 2004/0148158 A1 * | 7/2004 | Kobayashi ............ 704/201 |

FOREIGN PATENT DOCUMENTS

| JP | A-7-219586 | 8/1995 |
|---|---|---|
| JP | A-2000-206980 | 7/2000 |
| JP | A-2001-166784 | 6/2001 |

* cited by examiner

*Primary Examiner*—Brian L Albertalli
(74) *Attorney, Agent, or Firm*—Posz Law Group, PLC

(57) ABSTRACT

In a navigation system, a switching use dictionary is provided as storing an aggregation of switching commands, which are also stored in the individual language-specific dictionaries including the language 1 dictionary, language 2 dictionary, ..., and language n dictionary. It is determined whether a switching command included in the switching use dictionary is matched with an inputted speech. When a certain switching command is determined to be matched with the inputted speech, a certain language-specific dictionary corresponding to the certain switching command is substituted for a default active language-specific dictionary. Thus, the certain language-specific dictionary is newly selected as an active language-specific dictionary used for operating the navigation system by a speech input.

17 Claims, 3 Drawing Sheets

SPEECH RECOGNITION APPARATUS AND NAVIGATION SYSTEM

CROSS REFERENCE TO RELATED APPLICATION

This application is based on and incorporates herein by reference Japanese Patent Application No. 2006-68051 filed on Mar. 13, 2006.

FIELD OF THE INVENTION

The present invention relates to a speech recognition apparatus and a navigation system.

BACKGROUND OF THE INVENTION

A conventional speech recognition apparatus can support or be used in multiple languages. Here, one of the languages needs to be selected from the multiple languages as an active language. A speech recognition can be then started for the selected language as the active language. Further, selecting the active language may be performed by speech input. For instance, suppose a case that English is designated as a present active language and the active language is going to be changed from English to Japanese. In this case, uttering an English speech is required for changing the active language from English to Japanese. This may prevent language selection by a user who cannot speak English. Further, an indefinite pronunciation in an English speech by a user who cannot ordinarily speak English may cause a mis-recognition, which makes it difficult to change the active language from English to Japanese.

Patent document 1 discloses a technology to solve such disadvantage. This technology includes a memory device for memorizing multiple language-specific dictionaries (Japanese, English, and German dictionaries). This memory device memorizes, with respect to each language-specific dictionary, recognition target words including (i) speech commands for operating a navigation system and (ii) language identification words for determining which language an inputted speech belongs to. Based on a result from the speech recognition for the inputted speech, language-specific dictionaries are switched therebetween to thereby retrieve a recognition target word matching the inputted speech.

Patent document 1: JP-A-2001-83991

In the above technology, the individual language-specific dictionaries stored in the memory device needs to be switched in series to retrieve a recognition target word matching the inputted speech, depending on the language of the inputted speech. For instance, a certain language may need to wait until all the language-specific dictionaries other than that of the certain language are thoroughly searched. Further, when the greater number of language-specific dictionaries are supported or included in the memory device, the longer retrieval time are consumed.

SUMMARY OF THE INVENTION

It is an object of the present invention to provide a speech recognition apparatus and navigation system to facilitate switching to a language-specific dictionary corresponding to a language of an inputted speech.

According to an aspect of the present invention, a speech recognition apparatus is provided as follows. An input unit is configured to be used for inputting a speech. A dictionary storage unit is configured to store a plurality of language-specific dictionaries and a switching use dictionary. Each language-specific dictionary is specific to one of a plurality of languages and includes (i) speech commands for operating a target application and (ii) switching commands for selecting the each language-specific dictionary as an active language dictionary used when the target application is operated by a speech via the input unit. The switching use dictionary includes an aggregation of switching commands included in all the language-specific dictionaries. A determination unit is configured to determine whether a certain speech inputted via the input unit is matched with a switching command in the switching use dictionary. A switching unit is configured to select, as the active language-specific dictionary, a language-specific dictionary corresponding to a switching command, which the certain speech is determined to be matched with.

According to another aspect of the present invention, a speech recognition apparatus is provided as follows. An input unit is configured to be used for inputting a speech. A speech recognition dictionary storage unit is configured to store a plurality of language-specific dictionaries, each language-specific dictionary which is specific to one of a plurality of languages and includes speech commands for operating a target application. A command identification unit is configured to compare a speech inputted via the input unit with a speech command included in an active language-specific dictionary, which is one of the language-specific dictionaries, to thereby identify a speech command indicated by the speech inputted via the input unit. A switching use dictionary storage unit is configured to store a switching use dictionary, which includes an aggregation of switching commands for selecting one of the language-specific dictionaries as the active language dictionary used by the command identification unit. A determination unit is configured to determine whether a certain speech inputted via the input unit is matched with a switching command in the switching use dictionary. A switching unit is configured to select, as the active language-specific dictionary used by the command identification unit, a language-specific dictionary corresponding to a switching command, which the certain speech is determined to be matched with.

According to yet another aspect of the present invention, a navigation system is provided as follows. The above speech recognition apparatus as the aspect or the another aspect of the present invention is included in the navigation system. Further, an execution unit is included to execute a map display, a facility retrieval process, a route designation process, or a route guide process, based on a speech command, which is matched with a speech inputted via the input unit and stored in a language-specific dictionary selected as the active language-specific dictionary.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

A speech recognition apparatus of the present invention is directed at a navigation system as an embodiment.

Figure 1:
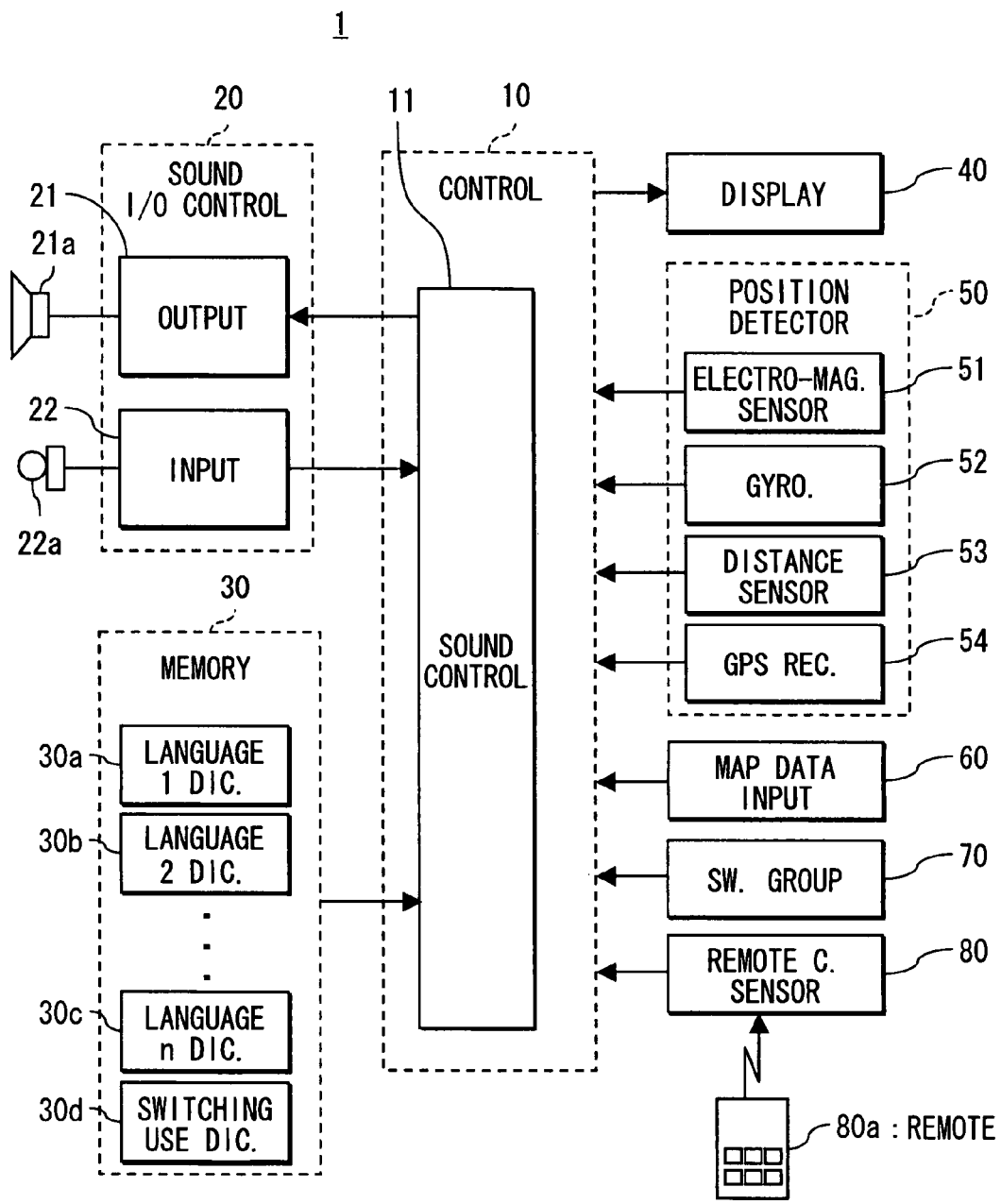
FIG. 1 is shows an overall configuration of a navigation system according to an embodiment of the present invention.

FIG. 1 shows an overall configuration of the navigation system 1 mounted in a subject vehicle. The system 1 includes a control unit 10 as a main component and other peripherals connected with the control unit 10. The peripherals include a sound input/output control unit 20, a memory device 30 for speech dictionaries, a display unit 40, a position detector 50, a map data input unit 60, an input device such as an operation switch group 70 or remote control sensor 80. The control unit 10 is a typical computer having a CPU, ROM, RAM, I/O, and a bus line connecting the foregoing. The control unit 10 includes a sound control unit 11.

The sound input/output control unit 20, which is connected to the sound control unit 11, includes a sound output control unit 21 and sound input control unit 22. The sound output control unit 21 connects with a speaker 21*a*, via which sounds or speeches are outputted by the sound output control unit 21 based on instructions from the sound control unit 11. The sound output control unit 21 has an amplifier to amplify and output sound signals. Outputted sounds include a mechanically synthesized synthetic speech.

The sound input control unit 22 includes a filter circuit and connects with a microphone. The sound input control unit 22 removes noises other than speech frequencies from speeches inputted by a user via the microphone and outputs the processed speeches to the sound control unit 11. Thus, an inputted speech is allowed to operate a variety of functions (as target applications) of the navigation system 1.

Figure 2:
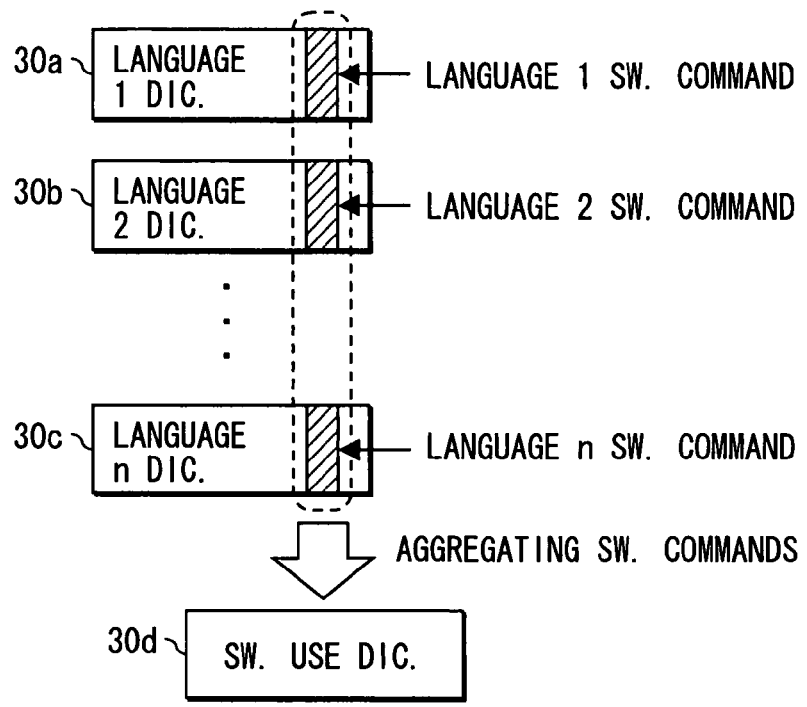
FIG. 2 is a diagram explaining a switching use dictionary.

The memory device 30 for speech dictionaries stores multiple language-specific dictionaries such as a language 1 dictionary 30*a*, a language 2 dictionary 30*b*, . . . , and a language n dictionary 30*c* for individually different languages such as a language 1, a language 2, . . . , and a language n, respectively. Each dictionary 30*a*, 30*b*, 30*c* stores (i) speech commands for operating the navigation system 1 or target applications and (ii) switching commands for switching the language-specific dictionaries to each other (i.e., selecting a certain language-specific dictionary as an active language-specific dictionary (which will be explained later)). Further, as shown in FIG. 2, the memory device 30 stores a switching use dictionary 30*d* for switching language-specific dictionaries therebetween. This switching use dictionary 30*d* stores an aggregation of the switching commands in all the language-specific dictionaries 30*a*, 30*b*, 30*c*.

The display unit 40 includes a color display device such as a liquid crystal display or CRT. The display unit 40 displays information from the navigation system 1 to a user. The position detector 50 includes a known electromagnetic sensor 51, gyroscope 52, distance sensor 53, and GPS (Global Positioning System) receiver 54 for detecting a position of the vehicle based on electric waves from satellites.

Sensors or the like 51 to 54 have individual types of detection errors, and are thus used to compensate each other. Depending on required accuracy levels, only part of them may be used, or another sensor such as a rotation sensor for wheels or wheel sensor for each following wheel may be additionally or alternatively included.

The map data input unit 60 is used to input various data such as map data and map-matching data for increasing a position detection accuracy. A storage medium may be usually a CD-ROM from the required data volume; however, it may be another medium such as a DVD or memory card.

The operation switch group 70 is mechanical switches or touch-sensitive switch integrated with the display unit 40. The remote control sensor 80 obtains operation information via a remote 80*a*.

Thus, a so-called navigation function can be constituted by the control unit 10, display unit 40, position detector 50, map data input unit 60, operation switch group 70, remote control sensor 80, or the like. The display unit 40 displays to superimpose, in its screen, map data and additional data such as a guided route, name, landmark, or the like inputted via the map data input unit 60, and a vehicle's present position mark.

When a destination or a specific route such as an expressway is designated via the operation switch group 70, remote 80*a*, or microphone 22*a*, an optimum route from the present position to the destination is automatically selected and displayed as a guide route.

Such route designation process may use the known Dijkstra method. After the guide route is displayed, a speech for guiding a user along the route is outputted via the speaker 21*a* from the sound output control unit 21 based on traveling states of the vehicle. Designation or display in the guide route is not pertinent to a characteristic part of the present invention, so it will not be explained. Further, the navigation system 1 further performs a facility retrieval process for retrieving facilities on map and a map display process for displaying a vehicle's present position mark and its vicinity in addition to the route guide process.

In the navigation system 1, a language-specific dictionary used as a reference dictionary or active in a speech input can be selected or switched among the multiple language-specific dictionaries 30*a*, 30*b*, 30*c* via a speech input.

Next, such active language-specific dictionary switching process will be explained with reference to a flowchart in FIG. 4. The active language-specific dictionary switching process is automatically performed by the sound control unit 11 when a power is supplied to the navigation system 1. For instance, when mounted in a vehicle, the process is executed with the vehicle engine started or the accessory switch turned on. Alternatively, the process may be executed based on a switching operation by a user.

When the navigation system 1 is shipped from a factory, a first one of the multiple language-specific dictionaries 30*a* to 30*c* is previously selected as a default active language-specific dictionary, which is used as default for a speech input, e.g., for operating a target application. The active language-specific dictionary may be also called a reference language-specific dictionary. When another second language-specific dictionary is afterward selected as an active language-specific dictionary used for a speech input in the active language-specific dictionary switching process, the second language-specific dictionary is newly selected as a default active language-specific dictionary. In other words, a default active language-specific dictionary is switched from the first language-specific dictionary to the second language-specific dictionary, which is selected in the active language-specific dictionary switching process.

Figure 4:
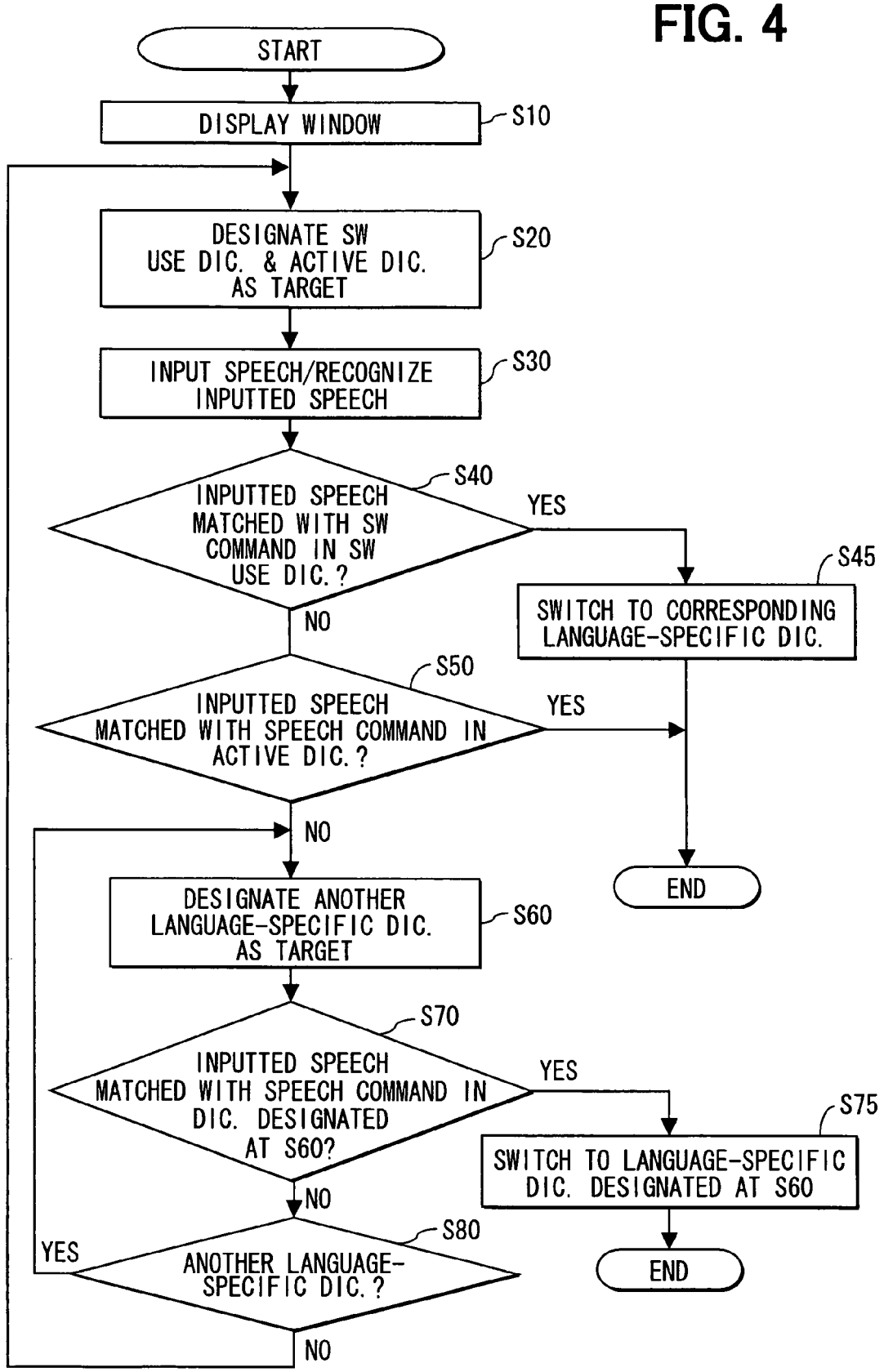
FIG. 4 is a flowchart illustrating an active language-specific dictionary switching process.

At Step S10 in FIG. 4, the display unit 40 displays a window. Here, the window is displayed to indicate language-specific speeches for each language 1, 2, n to facilitate a user's speech input. For instance, a display for a speech specific to English is "Switch language_English".

Figure 3:
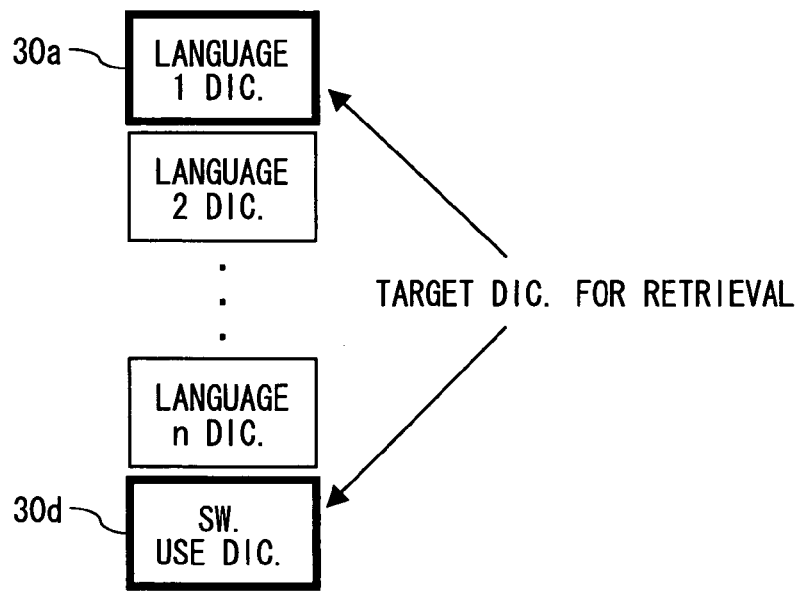
FIG. 3 is a diagram explaining a target dictionary for retrieval.

At Step S20, both (i) the switching use dictionary 30*d* and (ii) the active language-specific dictionary are designated as a target dictionary for retrieval or determination whether a language of an inputted speech matches with the language of the active language-specific dictionary. For instance, as shown in FIG. 3, the current active language-specific dictionary is the language 1 dictionary 30a, the target dictionary is both (i) the switching use dictionary 30d and (ii) the language 1 dictionary 30a.

At Step S30, a speech input and speech recognition are performed. A speech is inputted by a user to the sound input control unit 22 via the microphone 22a. Then, it is determined whether the inputted speech matches any one of switching commands included in the switching use dictionary 30d and speech commands included in the language 1 dictionary 30a. Thus, the inputted speech can be also matched with speech commands included in the language 1 dictionary 30a, presently designated as the active language-specific dictionary, in addition to the switching commands.

At Step S30, the switching commands may be preferentially matched with the input speech compared with the speech commands. Thus, the inputted speech can be determined to be matched with the switching commands in advance. Even when determined not to be matched with the switching commands, it can be then determined whether the inputted speech is matched with the speech commands included in the default active language-specific dictionary.

At Step S40, based on the determination at Step S30, it is determined whether the inputted speech matches with the switching commands included in the switching use dictionary 30d. When the determination at Step S40 is affirmed, a language-specific dictionary corresponding to a switching command matching with the inputted speech is substituted for the present active language-specific dictionary (e.g., the language 1 dictionary 30a) and selected as a new active language-specific dictionary. The process then ends.

In contrast, when the determination at Step S40 is negated, it is then determined whether the inputted speech matches with speech commands included in the active language-specific dictionary, i.e., presently the language 1 dictionary 30a. When the determination at Step S50 is affirmed, the active language-specific dictionary need not be switched to another dictionary. The process thus ends.

At Step S60, another dictionary 30b to 30c other than the switching use dictionary 30d and language 1 dictionary 30a as the active language-specific dictionary is re-designated as a target dictionary for retrieval or determination whether a language of the inputted speech matches with the language thereof. At Step S70, it is determined whether the inputted speech matches with speech commands included in the target dictionary. When the determination at Step S70 is affirmed, the active language-specific dictionary is switched to the language-specific dictionary re-designated at Step S60 as the target dictionary (i.e., the language-specific dictionary re-designated at Step S60 as the target dictionary is selected as a new active language-specific dictionary). The process then ends.

In contrast, when the determination at Step S70 is negated, it is then determined whether another language-specific dictionary which has not been designated as the target dictionary is present or not at Step S80. When the determination at Step S80 is affirmed, Step S60 and subsequent steps are again performed. When the determination at Step S80 is negated, Step S20 and subsequent steps are again performed.

Here, when switching to a language-specific dictionary cannot be achieved after the steps from Step S20 to Step S80 are performed in a predetermined number (e.g., three) of repetitions, the process is terminated. The navigation system 1 then performs speech inputs and speech recognitions for various processes using the default active language-specific dictionary, which is designated before the active language-specific dictionary switching process is started. Further, after the active language-specific dictionary switching process is ended, a manual switching process may be started. Here, a window may be displayed to include a menu for a user to manually select a language used for speech input.

As explained above, in the navigation system 1 of the embodiment, a switching use dictionary 30d is provided as having an aggregation of switching commands stored in the individual language-specific dictionaries 30a to 30c including the language 1 dictionary 30a, language 2 dictionary 30b, . . . , and language n dictionary 30c. It is determined whether the switching commands included in the switching use dictionary 30d are matched with an inputted speech. When a certain switching command is determined to be matched with the inputted speech, an active language-specific dictionary is switched to a language-specific dictionary corresponding to the certain switching command from the default active language-specific dictionary.

Under the above configuration of the navigation system 1, a switching command matched with an inputted speech can be shortly retrieved using the switching use dictionary 30d without retrieval of serially switching the multiple language-specific dictionaries. As a result, the default active language-specific dictionary can be quickly replaced with a language-specific dictionary corresponding to the inputted speech.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A speech recognition apparatus comprising:
an input unit configured to be used for inputting a speech;
a dictionary storage unit configured to store a plurality of language-specific dictionaries and a switching use dictionary,
   each language-specific dictionary which is specific to one of a plurality of languages and includes (i) speech commands for operating a target application and (ii) switching commands for selecting the each language-specific dictionary as an active language dictionary used when the target application is operated by a speech via the input unit,
   the switching use dictionary which includes an aggregation of switching commands included in all the language-specific dictionaries;
a determination unit configured to determine whether a certain speech inputted via the input unit is matched with a switching command in the switching use dictionary; and
a switching unit configured to select, as the active language-specific dictionary, a certain language-specific dictionary corresponding to a certain switching command, which the certain speech is determined to be matched with.

2. The speech recognition apparatus of claim 1, wherein
the determination unit determines whether the certain speech is matched with a speech command, which is included in a language-specific dictionary presently selected as the active language-specific dictionary, in addition to the switching commands in the switching use dictionary.

3. The speech recognition apparatus of claim 2, wherein
the determination unit determines whether the certain speech is matched with the switching commands, which are included in the switching use dictionary, in preference to the speech commands, which are included in a language-specific dictionary presently selected as the active language-specific dictionary.

4. A navigation system comprising:
the speech recognition apparatus of claim 1; and
an execution unit configured to execute at least one of a map display, a facility retrieval process, a route designation process, and a route guide process, based on a speech command, which is matched with a speech inputted via the input unit and stored in a language-specific dictionary selected as the active language-specific dictionary.

5. The navigation system of claim 4, wherein:
when a power is supplied to the navigation system,
the determination unit of the speech recognition apparatus starts to determine whether the certain speech inputted via the input unit is matched with the switching command in the switching use dictionary; and
the execution unit starts to execute the at least one of the map display, the facility retrieval process, the route designation process, and the route guide process, based on the speech command, which is matched with the speech inputted via the input unit and stored in the language-specific dictionary selected as the active language-specific dictionary.

6. The speech recognition apparatus of claim 1, wherein:
when the determination unit determines that the certain speech inputted via the input unit is not matched with the switching command in the switching use dictionary,
the determination unit determines whether the certain speech inputted via the input unit is matched with speech commands in an active language-specific dictionary presently selected; and
when the determination unit determines that the certain speech inputted via the input unit is matched with speech commands in the active language-specific dictionary presently selected,
the active language-specific dictionary presently selected is used without being switched.

7. The speech recognition apparatus of claim 6, wherein:
when the determination unit determines that the certain speech inputted via the input unit is not matched with speech commands in the active language-specific dictionary presently selected,
the determination unit determines whether the certain speech inputted via the input unit is matched with speech commands in a language-specific dictionary other than the active language-specific dictionary presently selected.

8. The speech recognition apparatus of claim 1, further comprising:
a display unit configured to display the aggregation of switching commands included in the switching use dictionary so as to enable a user to select one of the plurality of language-specific dictionaries as the active language dictionary, thereby allowing the determination unit to determine whether the certain speech inputted via the input unit is matched with the switching command in the switching use dictionary.

9. A speech recognition apparatus comprising:
an input unit configured to be used for inputting a speech;
a speech recognition dictionary storage unit configured to store a plurality of language-specific dictionaries, each language-specific dictionary which is specific to one of a plurality of languages and includes speech commands for operating a target application;
a command identification unit configured to compare a speech inputted via the input unit with a speech command included in an active language-specific dictionary, which is one of the language-specific dictionaries, to thereby identify a speech command indicated by the speech inputted via the input unit;
a switching use dictionary storage unit configured to store a switching use dictionary, which includes an aggregation of switching commands for selecting one of the language-specific dictionaries as the active language dictionary used by the command identification unit;
a determination unit configured to determine whether a certain speech inputted via the input unit is matched with a switching command in the switching use dictionary; and
a switching unit configured to select, as the active language-specific dictionary used by the command identification unit, a certain language-specific dictionary corresponding to a certain switching command, which the certain speech is determined to be matched with.

10. The speech recognition apparatus of claim 9, wherein
the determination unit determines whether the certain speech is matched with a speech commands, which is included in a language-specific dictionary presently selected as the active language-specific dictionary, in addition to the switching commands in the switching use dictionary.

11. The speech recognition apparatus of claim 9, wherein
the determination unit determines whether the certain speech is matched with the switching commands, which are included in the switching use dictionary, in preference to the speech commands, which are included in a language-specific dictionary presently selected as the active language-specific dictionary.

12. A navigation system comprising:
the speech recognition apparatus of claim 9; and
an execution unit configured to execute at least one of a map display, a facility retrieval process, a route designation process, and a route guide process, based on a speech command, which is matched with a speech inputted via the input unit and stored in a language-specific dictionary selected as the active language-specific dictionary.

13. The navigation system of claim 12, wherein:
when a power is supplied to the navigation system,
the determination unit of the speech recognition apparatus starts to determine whether the certain speech inputted via the input unit is matched with the switching command in the switching use dictionary; and
the execution unit starts to execute the at least one of the map display, the facility retrieval process, the route designation process, and the route guide process, based on the speech command, which is matched with the speech inputted via the input unit and stored in the language-specific dictionary selected as the active language-specific dictionary.

14. The speech recognition apparatus of claim 9, wherein:
when the determination unit determines that the certain speech inputted via the input unit is not matched with the switching command in the switching use dictionary,
the determination unit determines whether the certain speech inputted via the input unit is matched with speech commands in an active language-specific dictionary presently selected; and
when the determination unit determines that the certain speech inputted via the input unit is matched with speech commands in the active language-specific dictionary presently selected,
the active language-specific dictionary presently selected is used without being switched.

15. The speech recognition apparatus of claim 14, wherein:
when the determination unit determines that the certain speech inputted via the input unit is not matched with speech commands in the active language-specific dictionary presently selected,
the determination unit determines whether the certain speech inputted via the input unit is matched with speech commands in a language-specific dictionary other than the active language-specific dictionary presently selected.

16. The speech recognition apparatus of claim 9, further comprising:
a display unit configured to display the aggregation of switching commands included in the switching use dictionary so as to enable a user to select one of the plurality of language-specific dictionaries as the active language dictionary, thereby allowing the determination unit to determine whether the certain speech inputted via the input unit is matched with the switching command in the switching use dictionary.

17. A speech recognition apparatus comprising:
input means for inputting a speech;
dictionary storage means for storing a plurality of language-specific dictionaries and a switching use dictionary,
  each language-specific dictionary which is specific to one of a plurality of languages and includes (i) speech commands for operating a target application and (ii) switching commands for selecting the each language-specific dictionary as an active language dictionary used when the target application is operated by a speech via the input means,
  the switching use dictionary which includes an aggregation of switching commands included in all the language-specific dictionaries;
determination means for determining whether a certain speech inputted via the input means is matched with a switching command in the switching use dictionary; and
switching means for selecting, as the active language-specific dictionary, a certain language-specific dictionary corresponding to a certain switching command, which the certain speech is determined to be matched with.

* * * * *